United States Patent [19]

Smith et al.

[11] 4,014,956

[45] Mar. 29, 1977

[54] THERMOPLASTIC POWDER COATING COMPOSITIONS

[75] Inventors: Oliver Wendell Smith, South Charleston; Joseph Victor Koleske, Charleston; Julius John Brezinski, St. Albans, all of W. Va.

[73] Assignee: Union Carbide Corporation, New York, N.Y.

[22] Filed: Sept. 13, 1974

[21] Appl. No.: 505,770

Related U.S. Application Data

[63] Continuation-in-part of Ser. No. 353,514, April 23, 1973, abandoned.

[52] U.S. Cl. .......................... 260/853; 260/18 PF; 260/31.8 M; 260/42.49; 260/45.95 S; 260/837 PV; 260/856; 260/899

[51] Int. Cl.[2] .......................................... C08L 27/06

[58] Field of Search ............................ 260/899, 853

[56] References Cited

UNITED STATES PATENTS

| | | | |
|---|---|---|---|
| 3,305,602 | 2/1967 | Bromstead | 260/899 |
| 3,660,149 | 5/1972 | Kucsma et al. | 260/899 |
| 3,660,320 | 5/1972 | Johnson et al. | 260/2.5 |
| 3,766,106 | 10/1973 | Yurimoto et al. | 260/17 A |

FOREIGN PATENTS OR APPLICATIONS

| | | | |
|---|---|---|---|
| 650,651 | 10/1962 | Canada | 260/899 |
| 608,654 | 9/1948 | United Kingdom | |

OTHER PUBLICATIONS

Industrial Carbon – Mantell 2nd Ed., p. 400.

*Primary Examiner*—Carman J. Seccuro
*Attorney, Agent, or Firm*—Francis M. Fazio

[57] ABSTRACT

Powder coating compositions of vinyl chloride polymers or blends thereof, which compositions have an average inherent viscosity of from about 0.2 to about 0.55 dl/gm, have been found that are useful for electrostatic spray coating to produce thin films.

14 Claims, No Drawings

THERMOPLASTIC POWDER COATING COMPOSITIONS

This application is a continuation-in-part of application Ser. No. 353,514, filed Apr. 23, 1973, now abandoned.

BACKGROUND OF THE INVENTION

The coatings industry is undergoing massive changes in its philosophy, a great deal thereof being the result of the ecological problems associated with the use of the conventional solvent-based coating compositions. In the past the most commonly used coatings were compositions of pigmented or unpigmented vehicles that were diluted with solvents to facilitate application. After application on the surface, the solvents were permitted to evaporate, often into the atmosphere, leaving a dry, uniform coating on the surface. With time, advances led to the development of organosols, plastisols, emulsions, dispersions, 100 percent reactive solids coatings, water-borne coatings, all of which are used today to some extent. In addition, within the past two decades much effort has been expended in the preparation and application of powder coatings, the initial impetus therefor being the discovery of the fluidized-bed technology in Germany. This initial effort in the powder coating field involves the submersion of a preheated article into a bed of powder particles, the particles generally being from 50 to 150 microns in size, fluidized by a stream of gas. On immersion in the fluidized-bed, powder particles adhere and coalesce on to the surface of the article forming a uniform coating, usually in excess of 5 mils thick and often as much as 100 mils thick. The relatively large particle sizes required for fluidized-bed coating technology precludes the formation of the thin coatings of from 0.2 to 2 or 3 mils thick that are often desired. Many further attempts have been made to apply such thin coatings, the most recent efforts being directed to the electrostatic spray coating of particles to the grounded article to be coated followed by heating to fuse the particles and form a uniform coating. This method has recently been finding wide acceptance because of the many advantages associated therewith, e.g., improved film properties, absence of volatile solvents, elimination of water pollution problems, elimination of preheat of the substrate, essentially 100 percent utilization of material, reduced capital expenditures, ease of changeover. However, many difficulties have been encountered in producing the powders required for this use since the conventional grinding and spray drying procedures heretofore used have not been capable of the production of powders having the desired physical properties that would enable one to obtain thin films by the electrostatic spray coating procedures. In the past difficulties have been experienced in producing particles of proper shape having the desired fine particle size and the desired particle size distribution required to obtain the desired film thicknesses. Previous processes include dry blending, melt processing, wet processing, spray drying and combinations and modifications of these.

One area of special interest for thin film powder coatings is the area of vinyl halide polymers. However, experience has shown that vinyl halide polymers, such as poly (vinyl chloride) and copolymers thereof, generally cannot be applied in thin film coatings from powders because such polymers cannot be economically ground to the fine sizes required for electrostatic spray application and generally powder coatings thereof do not have the physical properties and appearance desired.

SUMMARY OF THE INVENTION

Powder coating compositions of vinyl halide polymers that have good storage stability at room temperature and the desired particle size which can be thermally cured to produce thin protective films having good adhesion and appearance have now been discovered. These powders have good flow properties during curing and are readily applied by electrostatic spray techniques. The powder compositions contain either a single vinyl chloride copolymer having a critical inherent viscosity of from about 0.2 to about 0.55 dl/gm or blends of vinyl chloride copolymers having a critical range of average inherent viscosity of from about 0.2 to about 0.55 dl/gm, as hereinafter more fully described.

DESCRIPTION OF THE INVENTION

The powder coatings of this invention are vinyl chloride polymers powders whose particles range in particle size range from 1 to 75 microns, preferably from 5 to 40 microns, most preferably from 5 to 25 microns. Generally the powders contain less than five percent of the particles of a size larger than 75 microns. The powders can be produced by spray drying, spray precipitation, fluid-energy mill grinding, cryogenic grinding, or by any other suitable means or combination of means.

The vinyl chloride polymers used to produce the powders are preferably a blend of two or more copolymers with the blend having an average inherent viscosity of from about 0.2 to about 0.55 dl/gm. Though "blends" are preferred, a single copolymer may be used if such copolymer possesses all of the desired and necessary attributes needed to produce a good coating. Blending is preferred for it allows economic formulation latitude through proper selection of polymers that have desired adhesion to the various substrates and the improvement of other physical properties such as flexibility, toughness, gloss, permeation, flow, or uniformity of film. There are instances, however, when a single copolymer may be available that possesses all of the desired attributes and physical and chemical properties; such copolymer with the proper inherent viscosity is within the scope of this invention. Compositions having an average inherent viscosity of from about 0.3 to about 0.45 dl/gm are preferred and when a melt flow modifier is present in the composition the average inherent viscosity is preferably from about 0.3 to about 0.5 dl/gm. The average inherent viscosity $\eta\, inh$ av. of the system or formulation of polymers or copolymers is calculated from the expression $$\eta inh)_{av} = \sum_{i=1}^{n} \omega i\, \eta inh)_i$$

In this expression $\omega i$ is the weight fraction of the $i$ th polymer or copolymer, which has an inherent viscosity $\eta\ inh\ i$, in the mixture of n component polymers or copolymers. For purposes of this calculation all values of $\eta\ inh\ i$ are determined at the same concentration and at the same temperature in the same solvent. For the ranges given above the concentration is 0.2 gm/dl, the temperature is 30° C., and the solvent is cyclohexanone. The procedure used to define the inherent viscosity of the vinyl polymers is described in ASTM D-1243. The value of $\eta$ inh is calculated from $$\eta inh = \frac{(\ln t/t_o}{C}$$

where $1n$ indicates the natural logarithm, $t$ is the efflux time for a given volume of the solution of polymer which contains polymer in the amount of $c$ gm/dl to pass through a capillary, and $t_0$ is the efflux time of the same volume of solvent that does not contain any polymer to pass through the same capillary.

The vinyl chloride polymers that can be used to produce the compositions used to make the powders are well known. Any vinyl chloride homopolymer or copolymer can be used that has a vinyl chloride content of at least 50 weight percent preferably of at least 70 weight percent. The comonomers present include any of the known ethylenically unsaturated monomers copolymerizable with vinyl chloride. Illustrative thereof one can mention ethylene, propylene, vinylidene chloride, acrylonitrile, acrylamide, methacrylonitrile, styrene, acrylic acid, isodecyl acrylate, 2-hydroxyethyl acrylate, 2-hydroxypropyl acrylate, methacrylic acid, maleic acid, itaconic acid, fumaric acid, the methyl half esters of these dicarboxylic acids, methyl methacrylate, ethyl acrylate, 2-ethylhexyl acrylate, vinyl acetate, vinyl butyrate, vinyl benzoate, butadiene, isoprene, vinyl alcohol, isopropenyl methyl ketone, vinyl methyl ketone, norbornene, ethylidenenorbornene, vinyl ethyl ether, vinyl isobutyl ether, chlorostyrene, the vinyl trialkoxysilanes, and the like. The production of these polymers is well known in the art and many vinyl polymers are commercially available wherein one or more comonomers are copolymerized with vinyl chloride at various concentrations of each.

Illustrative copolymers are 86/14 vinyl chloride/vinyl acetate, 91/3/6 vinyl chloride/vinyl acetate/vinyl alcohol, 83/16/1 vinyl chloride/vinyl acetate/maleic acid, 80/10/10 vinyl chloride/vinyl acetate/glycidyl methacrylate, 80/5/15 vinyl chloride/vinyl acetate/2-hydroxypropyl acryalte, 69/22/9 vinyl chloride/dibutyl maleate/monobutyl maleate, 85/12/3 vinyl chloride/vinyl acetate/methacrylic acid, 60/40 vinyl chloride/vinylidene chloride, 73/27 vinyl chloride/vinyl isobutyl ether, and the like.

A particularly suitable group of polymers is the group of vinyl chloride/vinyl acetate copolymers, including such copolymers modified with a third comonomer such as maleic acid or vinyl alcohol. Any of the known processes can be used to produce the copolymers.

The polymers used in the production of the powder coating compositions having an average inherent viscosity of from about 0.2 to about 0.55 dl/gm, individually preferably have inherent viscosities within this range. However, when individual polymers are used it was found that they often do not produce powder coatings having the desired properties and that blends were necessary. The blends preferably contain a positive amount up to 85 weight percent of one or more polymers having an inherent viscosity of about 0.3 dl/gm or less and the balance being one or more polymers having an inherent viscosity of above 0.3 dl/gm; with the proviso that the blend containing at least two vinyl chloride polymers has an average inherent viscosity of from 0.2 to 0.55 dl/gm. Decreasing the concentration in the blend of the polymers having an average inherent viscosity of 0.3 dl/gm or less results in less favorable melt flow behavior and improved flexibility and blush rating properties. Thus, one skilled in the art can by simple experimentation adjust the ratios of the polymers in the blends so as to obtain the most desirable properties in the end product that he requires for the ultimate use contemplated. The formulated powders having glass transition temperatures of about 40° C, or above have been observed to have good room temperature storage stability.

The compositions of this invention are convertible to the desirable powder form, by simple and inexpensive methods. In addition, the powders are readily applied to the substrate by conventional means, including electrostatic spray techniques and electrotrostatic fluidized bed techniques.

In an embodiment of this invention a typical blend suitable for use in the production of powder coatings can contain up to 85 weight percent of an 86/14 vinyl chloride/vinyl acetate copolymer having an inherent viscosity of 0.43 dl/gm and a number average molecular weight of about 17,000, up to 15 weight percent of an 88/12 vinyl chloride/vinyl acetate copolymer having an inherent viscosity of 0.27 dl/gm and a number average molecular weight of about 9,500, about 10 weight percent of an 83/16/1 vinyl chloride/vinyl acetate/-maleic acid copolymer having a number average molecular weight of about 20,000 and an inherent viscosity of 0.48 to 0.51 dl/gm, about 5 weight percent of a 91/3/6 vinyl chloride/vinyl acetate/vinyl alcohol copolymer having an inherent viscosity of 0.43 dl/gm and a number average molecular weight of about 15,000 and about 0.5 weight percent of the diglycidyl ether of bisphenol A, as the thermal stabilizer. Typical blends within the confines of this invention would have an average inherent viscosity of from about 0.3 to 0.45 dl/gm and a number average molecular weight of from about 10,000 to about 17,000; they would also have a glass transition temperature of about 70° C.

One can also include in the blend, in the amounts conventionally used and well known to those skilled in the vinyl chloride polymers field, any of the additives generally used with vinyl chloride polymers. These include pigments or dyes (e.g. titanium dioxide, cadmium red, carbon black, phthalocyanine blue, toluidine red, iron oxide, calcium carbonate, barium sulfate), stabilizers (e.g. dibutyltin dilaurate, diactyltin mercaptide, alkylated phenols and bisphenols, barium-cadmium salts, epoxy resins), monomeric and polymeric plasticizers (e.g. dioctyl phthalate, di-2-ethylexyl phthalate, diisobutyl adipate, diisooctyl azelate, polymethylcaprolactone, poly(butyene glycol adipate), dispersants, flow control additives (the 75/25 copolymer of 2-ethylhexyl acrylate and ethyl acrylate; the 77.5/22,5 copolymer of n-hexyl acrylate and isodecyl acrylate), crosslinkers (polyols, polycarboxylic acids, polyamines, hydroxylamines, and other active hydrogen compounds), fungicides, bactericides, and many others known to those skilled in the art.

The components can be blended together by any known means, e.g., solution blending or hot compounding, and the homogeneous blend is then converted to powder form by conventional means. The formulated blends can be ground in suitable equipment, including cryogenic grinding, when the blend is in a dry form. Or, a solution blend can be spray dried or spray precipitated as shown in the examples and subsequently, if desired, mechanically ground or fluid energy milled. Those skilled in the art are fully familiar with the procedures and equipment needed to produce powders.

The powder compositions of this invention can be used to coat substrates in the same manner that powder coatings are applied at present. They find particular application in the fluidized bed powder coating field and in the electrostatic spray coating process. In the electrostatic spray process the powder is deposited on the substrate by electrostatic spray equipment and then cured or baked at elevated temperatures to form a uniform, smooth, glossy, thin coating that can be less than one mil thick if desired. Normally, a curing cycle of from 1 to 5 minutes at temperatures of from 125° C. to 250° C. is satisfactory; the cure time generally being sufficient to produce the film desired without resulting in polymer degradation or color formation and permitting adequate flow of the powder to form a satisfactory thin film. In some instances, longer periods are required and it is known that the time required is inversely related to the temperature. In the past, vinyl chloride polymers have very often not been useful in powder coatings because they generally could not be applied to form continuous thin films of about 0.5 mil to about 5 mils and they often did not have sufficiently good adherence to many substrates. The formulation of this invention, however, can be applied as thin films and do have good adherence to many substrates, whether or not the substrates are pre-treated or primed. In this application "thin film" means a film from 0.2 mil to 5 mils thick.

The cured powder coatings were evaluated by the following procedures:

Blush Rating:

The coated panels are immersed approximately three-fourths of their length into a glass water bath containing deionized, carbon dioxide free water for 45 minutes at about 70° C. The panels are removed, wiped dry and evaluated. The dried panels are viewed at a low angle, about 20°–30°, to determine if any change in appearance is obvious between the unimmersed and immersed sections of the coating. The rating assigned is based on visual observation of opacity or milkiness developed with acceptable coatings having a numerical rating of 7 or better. The following numerical rating is assigned:

10 — no visible effect
9 — barely perceptible visible haze
8 — very slight visible haze
7 — slight visible haze
6 — definite haze
5 — significant translucency in coating
4 — overall milky or translucent coating Cross Hatch Adhesion In this test the same water bath conditions are used; adhesion of the coating is tested immediately after removal of the coated panel from the water bath. After drying off excess water with a clean soft cloth, a "cross-hatch" pattern is cut through the coating with a special holder containing a series of 10 single-edge razor blades arranged parallel to each other and approximately one-eighth inch apart. The cross-hatch is made by cutting two sets of lines perpendicular to each other. A strip of 1-inch wide special contact adhesive tape (3M CO. No. 610) is placed over the cross-hatch and pressure is applied to eliminate air bubbles and provide a good bond. The tape is then pulled off in one quick pull at a 90° angle to the coated surface. The relative amount of the coating removed is observed and the approximate area percent of the cross-hatched section remaining on the substrate is recorded. Thus, a rating of 100 refers to no coating removal, a rating of 0 to complete removal. Satisfactory coatings will have a rating of 90 to 100 percent.

Manual Bend Flexibility

In this procedure, the coated metal panel is bent into a U-shape over a cylindrical rod of ⅛ diameter, with the coated section outside. The coating at and near the bend is then observed at various viewing angles with a low magnification lens for the presence of cracks or micro cracks. The presence of a significant number of such cracks signifies poor flexibility—inadequate elongation of the coating. The rating assigned is qualitative.

Wedge Bend Failure

The coated test panel is bent into a U shape over a ⅛ inch diameter mandrel with the coated section on the outside. The bent panel is then placed in the jaws of the Gardner "Coverall" Bend Impact Tester and the jaws are impacted with a 30 in-lb force which forms the bend into a wedge-shape, essentially flat at one end and about ⅛ inch diameter at the other end. The wedge-bent portion of the panel is immersed in acidic copper sulfate solution for five minutes. The solution is prepared by dissolving 20 g. of $CuSO_4 \cdot 3H_2O$ in 70 g. of water containing 10 g. of concentrated hydrochloric acid. The panels are withdrawn from the solution, rinsed with tap water, wiped dry with cheese cloth and observed for copper deposit which occurs at any point of film fracture or discontinuity. A low power magnifying lens is used to measure the distance in mm. from the sharp flat end of the wedge to the spot along the wedge where copper deposit is no longer observed. Preferred coatings show very low values; acceptable coatings for beverage containers yield typical values ranging between 0–25 mm.

The following examples serve to illustrate the invention.

EXAMPLE 1

A series of vinyl chloride polymers powder compositions was prepared by initially preparing an acetone solution having a 17.5 percent solids content and then spray-precipitating into isopropanol.

The spray-precipitation was carried out by spraying the polymers solution with a paint spray gun at 25° C. into a reactor containing about 4 gallons of isopropanol as the precipitant medium; during the spray-precipitation the contents of said reactor were thoroughly and vigorously stirred. The resulting precipitate slurry was passed through a 200 mesh screen to remove large particles and the effluent recovered from the screening was filtered and air dried at room temperature. The dried powder was broken into a fine, fluffy powder in a Waring blender with the particle sizes ranging from 10 to 20 microns. The powder compositions exhibited good flow properties and could be applied by electrostatic spray methods without difficulty. The dried powder compositions were electrostatically spray coated on tin-free steel using a Ransburg Electrostatic Spray Gun at 90,000 volts (negative) and 40 lb. air pressure. The powder coated panels were baked in an oven at 205° C. for four minutes and the fused films were about one mil thick, smooth, glossy and pin-hole free. All of the coatings passed the manual bend flexibility test and all had a 100 percent rating in the cross-hatch adhesion test. The coatings obtained in Runs A and B had a blush rating of 6 and all of the others had a rating of 7. Table A summarizes the details for each resin solution in this example. The amounts indicated in all tables are in parts by weight.

TABLE A

| Run | A | B | C | D | E | F |
|---|---|---|---|---|---|---|
| Acetone | 475 | → | | | | |
| Vinyl polymer I | 85 | 70 | 55 | 40 | 25 | 0 |
| Vinyl polymer II | 10 | → | | | | |
| Vinyl polymer III | 5 | → | | | | |
| Vinyl polymer IV | 0 | 15 | 30 | 45 | 60 | 85 |
| EPON 1002 | 0.5 | → | | | | |
| $\eta inh)_{ar.}$ | 0.43 | 0.41 | 0.39 | 0.36 | 0.33 | 0.31 |

Vinyl polymer I is an 86/14 vinyl chloride/vinyl acetate polymer having an inherent viscosity of 0.43 dl/gm and a number average molecular weight of about 17,000.
Vinyl polymer II is an 83/16/1 vinyl chloride/vinyl acetate/maleic acid polymer having an inherent viscosity of 0.37 dl/gm and a number average molecular weight of about 14,500.
Vinyl polymer III is a 91/3/6 vinyl chloride/vinyl acetate/vinyl alcohol polymer having an inherent viscosity of 0.50 to 0.55 dl/gm and a number average molecular weight of about 20,500.
Vinyl polymer IV is an 88/12 vinyl chloride/vinyl acetate polymer having an inherent viscosity of 0.27 dl/gm and a number average molecular weight of about 9,500.
EPON 1002 is the reaction product of bisphenol A and epichlorohydrin.

For comparative purposes, a powder coating produced using vinyl polymer II and containing an epoxide stabilizer yielded a coating having a blush rating of 4 and a cross-hatch adhesion rating of less than 80 percent.

EXAMPLE 2

A vinyl polymers formulation was prepared by dissolving 50 parts of vinyl polymer I, 10 parts of vinyl polymer II, 5 parts of vinyl polymer III, 35 parts of vinyl polymer IV, 0.5 part of the diglycidyl ether of bisphenol A and 0.3 part of a 75/25 polymer of 2-ethylhexyl acrylate/ethyl acrylate having a viscosity at 210° F., of about 800 to 3,500 centistokes, in 735 parts of acetone. The polymers solution was spray dried in a laboratory spray drier at inlet temperature of about 140° C. and an outlet temperature of about 55° C. The powder particles were ground in an oval fluid-energy mill having a 1.5 inches inside diameter at an air pressure of 80 to 90 psig and an inlet temperature of 63° C.; the particles were passed through the mill twice. The powder produced had good flow properties; the particles were irregular in shape and ranged in size from about 5 to about 50 microns. The powders were electrostatically spray coated on tin-free steel using a Ransburg Electrostatic Spray Gun at 90,000 volts (negative) and 40 lb. air pressure. The powder coated panels were baked in an oven at 205° C. for three minutes and a smooth, glossy adherent, pin-hole free film having good adhesion and blush resistance properties was obtained.

EXAMPLE 3

A series of vinyl chloride polymers powder compositions was prepared by the procedure described in Example 1. The spray-precipitated powders were air-dried at ambient conditions for three days. The powder particles ranged from 5 to 30 microns in size and had good flow properties. The dried powders were electrostatically spray coated on tin-free steel panels as described in Example 1 and then baked in an oven at 205° C. for four minutes; smooth, glossy, adherent, pin-hole free films were obtained. For comparative purposes a powder was produced using a single vinyl chloride polymer. The coating obtained in this instance was not commercialy acceptable. This is shown in the table as Run E. The details are summarized in Table B.

TABLE B

| Run | A | B | C | D | E |
|---|---|---|---|---|---|
| Resin Solution | | | | | |
| Acetone, pts. | 710 | ↔ | | | |
| Vinyl polymers I, pts. | 90 | 80 | 80 | 50 | — |
| Vinyl polymer II, pts. | — | — | 20 | 50 | 100 |
| Vinyl polymer V, pts. | 10 | 20 | — | — | — |
| ERL 2774, pts. | 0.5 | 0.5 | 1 | 1 | 1 |
| Flow control additive, sts | 0.2 | ↔ | | | |
| Film properties | | | | | |
| Thickness, mils | 1.1 | 1.1 | 1 | 0.9 | 0.8 |
| After water immersion at 65°C. for 45 minutes | | | | | |
| Blush | 10 | 10 | 10 | 9 | 9 |
| Cross hatch adhesion, % | 100 | 100 | 100 | 90 | 90 |
| Wedge bend failure, mm | 5 | 3 | 40 | 55 | 54 |
| After water immersion at 70°C. for 45 minutes | | | | | |
| Blush rating | 8 | 9 | 7 | 7 | 6 |
| Cross hatch adhesion, % | 100 | 100 | 90 | 100 | 80 |
| Wedge bend failure, mm | 1 | 1 | 4 | 18 | 16 |

Vinyl polymer V is an 86/13/1 vinyl chloride/vinyl acetate/maleic acid polymer having an inherent viscosity of 0.48 to 0.51 dl/gm and a number average molecular weight of 20,000.
ERL-2774 is the diglycidyl ether of bisphenol A.

The flow control of additive used is the 77.5/22.5 copolymer of hexylacrylate and isodecyl acrylate.

EXAMPLE 4

A formulation was prepared containing 70 parts of vinyl polymer I, 30 parts of vinyl polymer II, 0.5 part of the diglycidyl ether of bisphenol A, 0.2 part of the flow control additive of Example 3 and sufficient acetone to form a 13 percent resins solids solution. The solution was spray dried in a 7 foot diameter conical spray dryer, using a spinning wheel. Drying was effected using an inlet air temperature of 93° C. and an outlet air temperature of 38° C. The spray dried powder was ground in an oval fluid-energy mill having a 1.5 inches inside diameter at an air pressure of 80 to 90 psig and an inlet temperature of 63° C. The particles were passed through the mill twice. The powder produced had good flow properties. It was electostatically spray coated on tin-free steel and Bonderized steel using a Ransburg Electrostatic Spray Gun at 90,000 volts (negative) an 40 lb. air pressure, and the coated panels were baked in an oven at 205° C. for three minutes. Smooth, tough, glossy, adherent, pin-hole free 0.8 mil thick coatings were obtained having acceptable blush ratings.

EXAMPLE 5

A formulation was prepared containing 85 parts of vinyl polymer I, 10 parts of vinyl polymer II, 5 parts of vinyl polymer III, 0.5 part of diglycidyl ether of bisphenol A, 0.3 part of the same poly(2-ethylhexyl acrylated-/ethyl acrylate) flow control additive of Example 2 and sufficient acetone to obtain a 13 percent resins solids solution. The solution was spray dried in a laboratory spray dryer and the spray dried powder was then ground as described in Example 4. The yield of fine powder was about 85 percent. One hundred parts of powder was redissolved in 710 parts of acetone, 33 parts of titanium dioxide were added and the mixture was uniformly blended. This dispersion was spray dried in a laboratory spray dryer and the spray dried pigmented powder was then ground as described in Example 4. The powder produced had good flow properties and the irregularly shaped particles ranged in size from about 5 to about 50 microns. Steel panels were electrostatically spary coated and baked for 4 minutes as described in Example 4. The one mil coatings were tough, glossy and adherent; they had an acceptable appearance showing only a trace of orange peel effect.

EXAMPLE 6

A formulation was prepared containing 85 parts of vinyl polymer I, 5 parts of vinyl polymer III, 10 parts of vinyl polymer V, 0.5 part of diglycidyl ether of bisphenol A and 900 parts of acetone. The solution was filtered and spray precipitated into isopropanol as described in Example 1. The resulting slurry was sieved through a screen having openings 74 microns in size and then air dried at ambient conditions. The particles were spherical and ranged in size from about 10 to about 30 microns. The dried powder was electrostatically spray coated on tin-free steel and cured for four minutes in a 205° C. oven as in Example 1. The cured coatings were glossy and exhibited excellent adhesion. However, they showed only fair flow-out behavior and hence were only reasonably smooth because there was no flow control additive present in the formulation.

EXAMPLE 7

An acetone solution of an 83/16.6/0.4 vinyl chloride/vinyl acetate/maleic acid polymer, which had an inherent viscosity of 0.34 gm/dl in cyclohexanone at 30° C., was spray dried, and fluid-energy milled as described in Example 4. The powder obtained formed cured coatings with lumps on tin-free steel when applied with a Ransburg Electrostatic Spray Gun. However, excellent spraying and curing was achieved by micronizing the powder through a micronizer attached to the hose before the powder reached the gun. Smooth, uniform, pin-hole free, fused coatings were obtained having film thicknesses of from 0.3 to 2 mils using this micronized powder and curing at 380° F. for three minutes. Good blush behavior, adhesion and flexibility were obtained on tin-free steel, budium primed tin plate and epoxy-urea formaldehyde-primed tin plate with this micronized powder applied by the electrostatic spray method and oven cured.

EXAMPLE 8

Four hundred and ninety grams of an 85/15 vinyl chloride/vinyl acetate copolymer having an inherent viscosity of 0.34 dl/g, 140 grams of vinyl chloride polymer V, 70 grams of vinyl-chloride polymer III, 7 grams of the diglycidyl ether of bisphenol A and 0.7 grams of the flow control additive used in Example 2 were dissolved in 13,336 grams of acetone to form a 5% solids solution. This solution was spray dried and passed through a fluid energy mill twice as described in Example 4. Electrostatic deposition of the powder with an electrostatic spray unit equipped as described in Example 7 afforded a smooth, continuous, pin hole free coating at 0.5 mil. The coating exhibited excellent blush, adhesion and wedge bend flexibility over tin-free steel.

EXAMPLE 9

An autoclave varnish containing 1070 grams of an 85/15 vinyl chloride/vinyl acetate copolymer having an inherent viscosity of 0.34 dl/gm and 2650 grams of acetone was diluted to 10 percent solids with 6980 grams of acetone. This solution was blended with another solution containing 119 grams of vinyl chloride polymer V, 1.2 grams of the flow control additive used in Example 2, 12 grams of a reactive, modified triazine formaldehyde resin (Uformite QR-336) and 1190 grams of acetone. This solution was spray dried in a temperature laboratory spray dryer at an inlet air temperture of 125° C. The yield was 1,164 grams or 96.8 percent. Passing the product through a fluid energy mill twice as described in Example 4 afforded 1,119 gms of powder on a total yield of 93.1 percent. Electrostatic deposition with a Ransbury spray unit gave a pin hole free film 0.7 mil thick. The coating performance properties are set forth below on tin-free steel (Substrate A), epoxy-urea formaldehyde primed steel (Substrate B) and budium primed steel (Substrate C).

| Substrate | A | B | C |
|---|---|---|---|
| Cross hatch adhesion E | E | E | VG |
| Blush at 70° C. after 45 minutes | F | E | E |
| Wedge bend film | 58 | 18 | 40 |
| Cross hatch adhesion after 70° C. for 45 minutes | E | E | F–P |

E = excellent; VG = very good; F = fair; P = poor

As previously indicated and as shown in the examples, the powder coating compositions can also include any of the additives generally used with vinyl chloride polymers such as stabilizers, flow control additives, polyamines and amine resins. Illustrative of such compounds useful as heat stabilizers are the diglycidyl ethers of bisphenol-A and the polymers thereof, epoxidized oils such as epoxidized soybean oil, epoxidized linseed oil, epoxidized safflower oil, octyl epoxytallate, styrene oxide, beta-(3,4-epoxycyclohexyl)ethyl-trimethylsilane, 3,4-epoxycyclohexylmethyl 3,4-epoxycyclohexane carboxylate and the polyglycidyl ethers of the phenol formaldehyde novolac resins. Illustrative of polyamines and amine resins are the modified triazine formaldehyde resins such as Uformite QR-336, hexamethoxy-methylmelamine and resins thereof such as Cymel 300, methylolated or butylated benzoquanamine resins such as QR-336, butylated methylurea resins such as F-240, and other commercially available amines and amino resins. The preferred amines and amino resins for use are those which are stable in the dry state in the powder composition and do not have a detrimental effect on flow out or other property during the baking or curing. These generally used additives vary in the conventional amounts to be added; thus, the stabilizers can be present at from 0 to 5 weight percent of the powder, the amines or amino resins at from 0 to 10 weight percent and the flow modifiers at from 0 to 0.5 weight percent.

EXAMPLE 10

A formulation containing 238 parts of vinyl polymer I, 42 parts of a vinyl chloride/vinyl acetate/vinyl alcohol terpolymer having a solution viscosity of 35 centipoises at 25° C as a 20 percent solution in methyl ethyl ketone, 8.4 parts of a reactive, modified triazine formaldehyde resin (Uformite QR-336), 2.8 parts of the diglycidyl ether of bisphenol-A, 0.3 parts of a 75/25 polymer of 2-ethylhexyl acrylate/ethyl acrylate having a viscosity of 800-3,500 centistokes at 210° F and 2,915 parts of acetone by weight was mixed, filtered and spray dried. The powder was then ground in a fluid energy mill to yield a finely divided, free flowing powder. The powder was then electrostatically sprayed on budium and epoxy primed steel and chrome-chrome oxide treated steel. These powder coated substrates were cured for 2 minutes at 205° C. After curing, the films exhibited good wet adhesion, blush resistance, and flexibility properties.

EXAMPLE 11

A formulation was prepared containing 85 parts of vinyl polymer I, 10 parts of vinyl polymer II, 5 parts of vinyl polymer III, 0.5 part of an oligomer of diglycidyl ether of bisphenol-A having the formula:

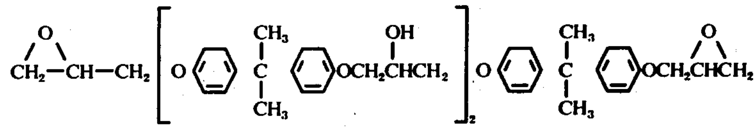

1 part of a ureaformaldehyde resin (F-240; Rohm and Haas Company) and 900 parts by weight acetone. The solution was sprayed from a conventional paint spray gun into a falling film of isopropanol non-solvent, filtered through a 44 micron sieve, collected on filter paper and allowed to dry under ambient conditions. The dried powder was subsequently electrostatically deposited on chrome-chrome oxide treated steel and cured in a high draft oven for 2, 4 and 6 minutes at 205° C. The cured films exhibited good toughness, blush resistance, and wet adhesion.

EXAMPLE 12

A solution of 266 parts of vinyl polymer I, 14 parts of the same vinyl chloride/vinyl acetate/vinyl alcohol terpolymer described in Example 10, 2.8 parts of the hexamethoxymethylmelamine, 0.3 part of the same flow modifier, described in Example 10, and 2,520 parts by weight of acetone was spray dried and passed twice through a fluid energy mill to afford a finely divided, formulated powder. Electrostatic application to chrome-chrome oxide treated steel, budium primed steel and epoxy primed steel can stock and subsequent fusing in an oven for 1 and 2 minutes at 205° C gave smooth films with good adhesion, blush resistance, and flexibility.

What is claimed is:

1. A dry vinyl chloride copolymer powder coating composition suitable for the production of thin films, said powder composition having essentially all of the powder particles ranging in size from 1 micron to 75 mircons and consisting of a mixture of two or more vinyl chloride copolymers that have at least 50 weight percent vinyl chloride polymerized in each copolymer in said mixture, wherein the mixture comprises (a) a positive amount up to 85 weight percent, based on the total weight of copolymers present, of at least one vinyl chloride copolymer having an inherent viscosity up to 0.3 dl/gm with (b) the balance being one or more vinyl chloride copolymers having an inherent viscosity above 0.3 dl/gm, said mixture having an average inherent viscosity of from 0.2 to 0.55 dl/gm.

2. A powder coating composition as claimed in claim 1 wherein at least one vinyl chloride copolymer is poly(vinyl chloride/vinyl acetate).

3. A powder coating composition as claimed in claim 1 wherein the particles range in size from 5 to 40 microns.

4. A powder coating composition as claimed in claim 1 wherein the mixture of vinyl chloride copolymers has an average inherent viscosity of from 0.3 to 0.45 dl/gm.

5. A dry vinyl chloride copolymer powder coating composition suitable for the production of thin films, said powder composition having essentially all of the powder particles ranging in size from 1 micron to 75 microns and consisting of from 0 to 5 weight percent epoxy heat stabilizer, from 0 to 10 weight percent polyamine or amine resin, from 0 to 0.5 weight percent flow modifier and a mixture of two or more vinyl chloride copolymers that have at least 50 weight percent vinyl chloride polymerized in each copolymer in said mixture, wherein the mixture comprises (a) a positive amount up to 85 weight percent, based on the total weight of copolymers present, of at least one vinyl chloride copolymer having an inherent viscosity up to 0.3 dl/gm. with (b) the balance being one or more vinyl chloride copolymers having an inherent viscosity above 0.3 dl/gm., said mixture having an average inherent viscosity of from 0.2 to 0.55 dl/gm.

6. A dry vinyl chloride copolymer powder coating composition suitable for the production of thin films, said powder composition having essentially all of the powder particles ranging in size from 1 micron to 75 microns and consisting of from 0 to 5 weight percent epoxy heat stabilizer, from 0 to 10 weight percent polyamine or amine resin, from 0 to 0.5 weight percent flow modifier and a mixture of two or more vinyl chloride copolymers that have at least 50 weight percent vinly chloride polymerized in each copolymer in said mixture, wherein the mixture comprises (a) a positive amount up to 85 weight percent, based on the total weight of copolymers present, of at least one vinyl chloride copolymer having an inherent viscosity up to 0.3 dl/gm. with (b) the balance being one or more vinyl chloride copolymers having an inherent viscosity above 0.3 dl/gm., said mixture having an average inherent viscosity of from 0.2 to 0.55 dl/gm. and wherein at least one vinyl chloride copolymer is poly(vinyl chloride/vinylacetate).

7. A dry vinyl chloride copolymer powder coating composition suitable for the production of thin films, said powder composition having essentially all of the powder particles ranging in size from 5 microns to 40 microns and consisting of from 0 to 5 weight percent epoxy heat stabilizer, from 0 to 10 weight percent polyamine or amine resin, from 0 to 0.5 weight percent flow modifier and a mixture of two or more vinyl chloride copolymers that have at least 50 weight percent vinyl chloride polymerized in each copolymer in said mixture wherein the mixture comprises (a) a positive amount up to 85 weight percent, based on the total weight of copolymers present, of at least one vinyl chloride copolymer having an inherent viscosity up to 0.3 dl/gm. with (b) the balance being one or more vinyl chloride copolymers having an inherent viscosity above 0.3 dl/gm., said mixture having an average inherent viscosity of from 0.2 to 0.55 dl/gm.

8. A dry vinyl chloride copolymer powder coating composition suitable for the production of thin films, said powder composition having essentially all of the powder particles ranging in size from 1 micron to 75 microns and consisting of from 0 to 5 weight percent epoxy heat stabilizer, from 0 to 10 weight percent polyamine or amine resin, from 0 to 0.5 weight percent flow modifier and a mixture of two or more vinyl chloride copolymers that have at least 50 weight percent vinyl chloride polymerized in each copolymer in said mixture, wherein the mixture comprises (a) a positive amount up to 85 weight percent, based on the total weight of copolymers present, of at least one vinyl chloride copolymer having an inherent viscosity up to 0.3 dl/gm. with (b) the balance being one or more vinyl chloride copolymers having an inherent viscosity above 0.3 dl/gm., said mixture having an average inherent viscosity of from 0.3 to 0.45 dl/gm.

9. A powder coating composition as claimed in claim 5, wherein said amine resin is a triazine formaldehye resin.

10. A powder coating composition as claimed in claim 5, wherein said amine resin is a urea-formaldehyde resin.

11. A powder coating composition as claimed in claim 5, wherein said polyamine is hexamethoxymethylmelamine.

12. A powder coating composition as claimed in claim 8, wherein said amine resin is a triazine formaldehyde resin.

13. A powder coating composition as claimed in claim 8, wherein said amine resin is a urea-formaldehyde resin.

14. A powder coating composition as claimed in claim 8, wherein said polyamine is hexamethoxymethylmelamine.

* * * * *